US008226739B1

(12) United States Patent
McNatt et al.

(10) Patent No.: US 8,226,739 B1
(45) Date of Patent: Jul. 24, 2012

(54) INVERTED FRUSTO-CONICAL SPIN-ON THROW-AWAY BARRIER FILTER CARTRIDGE FOR PULSE BACK VACUUM APPLICATIONS

(76) Inventors: Glenn R. McNatt, Chickasha, OK (US); Gary G. McNatt, Chickasha, OK (US)

( * ) Notice: Subject to any disclaimer, the term of this patent is extended or adjusted under 35 U.S.C. 154(b) by 1579 days.

(21) Appl. No.: 11/052,355

(22) Filed: Feb. 7, 2005

(51) Int. Cl.
*B01D 46/00* (2006.01)

(52) U.S. Cl. .............................. 55/498; 56/502; 56/521

(58) Field of Classification Search ................ 55/498, 55/521, 505; 210/232, 493.2
See application file for complete search history.

(56) References Cited

U.S. PATENT DOCUMENTS

| 1,856,685 | A | * | 5/1932 | Anderson | 55/413 |
| 3,232,437 | A | * | 2/1966 | Hultgren | 210/440 |
| 3,333,703 | A | * | 8/1967 | Scavuzzo et al. | 210/232 |
| 3,567,023 | A | * | 3/1971 | Buckman et al. | 210/130 |
| 3,685,658 | A | * | 8/1972 | Baldwin | 210/440 |
| 4,253,954 | A | * | 3/1981 | Midkiff et al. | 210/315 |
| 4,369,113 | A | * | 1/1983 | Stifelman | 210/440 |
| 4,617,118 | A | * | 10/1986 | Smart | 210/232 |
| 4,692,245 | A | * | 9/1987 | Church et al. | 210/232 |
| 4,740,299 | A | * | 4/1988 | Popoff et al. | 210/232 |
| 4,743,374 | A | * | 5/1988 | Stifelman | 210/440 |
| 4,834,885 | A | * | 5/1989 | Misgen et al. | 210/440 |
| 4,921,600 | A | * | 5/1990 | Meissner | 210/167.1 |
| 5,104,537 | A | * | 4/1992 | Stifelman et al. | 210/440 |
| 5,415,677 | A | * | 5/1995 | Ager et al. | 55/482 |
| 5,549,724 | A | * | 8/1996 | Mochida | 55/521 |
| 5,556,440 | A | * | 9/1996 | Mullins et al. | 55/498 |
| 5,711,878 | A | * | 1/1998 | Ogata et al. | 210/490 |
| 5,783,078 | A | * | 7/1998 | Roll et al. | 210/444 |
| 5,902,365 | A | * | 5/1999 | Haggard | 55/498 |
| 5,984,109 | A | * | 11/1999 | Kanwar et al. | 210/440 |
| 6,322,697 | B1 | * | 11/2001 | Hacker et al. | 210/248 |
| 6,626,299 | B1 | * | 9/2003 | Brown et al. | 210/450 |
| 6,833,023 | B1 | * | 12/2004 | Vandenberghe et al. | 95/268 |
| 6,884,274 | B2 | * | 4/2005 | Niakan et al. | 55/486 |
| 7,070,642 | B2 | * | 7/2006 | Scott et al. | 55/498 |
| 2005/0211623 | A1 | * | 9/2005 | Moscaritolo et al. | 210/440 |
| 2006/0186036 | A1 | * | 8/2006 | South et al. | 210/443 |
| 2006/0225389 | A1 | * | 10/2006 | Scott et al. | 55/498 |

* cited by examiner

*Primary Examiner* — Duane Smith
*Assistant Examiner* — Ives Wu
(74) *Attorney, Agent, or Firm* — Gable Gotwals

(57) ABSTRACT

A spin-on barrier filter cartridge is provided in which an inverted frustum-shaped filter media defines a clean air chamber. A bottom cap blocks air flow through a bottom of the chamber and a top cap restricts air flow through a top of the chamber into a passage concentric with the chamber. The filter media has a pleated cross-section and an inverted frustum-shaped screen-like core abuts the inner apices of the pleated media. The bottom and top caps are fixed to the bottom and top edges of the media to hold the cartridge together and also to seal the junctions against air flow. A nipple extends upwardly from the top cap and defines the concentric passage. The nipple is threaded for spin-on connection to the vacuum in a direction such that the engagement is tightened in response to vortical air flow in the chamber.

19 Claims, 4 Drawing Sheets

INVERTED FRUSTO-CONICAL SPIN-ON THROW-AWAY BARRIER FILTER CARTRIDGE FOR PULSE BACK VACUUM APPLICATIONS

BACKGROUND OF THE INVENTION

This invention relates generally to vacuum filters and more particularly concerns a vacuum filter cartridge specially adapted for pulse-back vacuum applications.

Filters presently used in pulse back vacuum applications have circular cylindrical media configurations. Since the walls are vertical, filtered particulate which contacts the walls tends to remain against the walls even when there is no suction in the intake direction. The pulse-back action momentarily puffs particulate in the reverse direction away from the filter, but some dislodged particulate is recaptured by the filter before gravity settles it to the bottom of the dust canister.

Conical filters are sometimes used in non-pulse-back vacuum applications. Some have a casing on the outside wall of the filter which makes them inefficient or even unsuitable for pulse-back vacuum applications because the casing interferes with the pulse-back action. Even without the outside casing, known conical filters would all be less efficient in a pulse-back vacuum application than the circular cylinder media because falling particulate can descend only until it contacts the increasingly wider base of the media cone.

Furthermore, all of these filters, whether circular cylindrical or conical, have removable parts which must be disengaged to receive the media and re-engaged to secure the media during the media cleaning or replacement processes. Consequently, they not only clog quickly, but they also require inordinate expenditures of time to clean or replace them. The net result is a significant loss in useful operating time. This deficiency is especially troublesome in many construction-type applications. Particulate created by sanding, grinding and cutting wood, plaster, concrete and the like can clog a filter in a matter of minutes. A high percentage of the time and cost of a construction cleaning job is expended on cleaning and replacing filters. The unfortunate alternative presently is to work in a highly dust-contaminated atmosphere.

Another serious problem is encountered because of the complicated mounted structures. The removable components are generally secured by bolts and nuts and the junctions of components surrounding air flow paths are fitted with gaskets. The gaskets are generally not adequate to deal with types and quantities of contaminants encountered in construction applications. Moreover, the vibration of the machine during use, as well as the jostling of the machine during loading, transport and unloading, causes the bolts to loosen. Loosening of the bolts creates gaps in the system at the gaskets and elsewhere which allow collected particulate to be re-circulated through the machine clean air discharge and turbulently released into the atmosphere. In a matter of moments, a room can be filled with drifting particulate which cannot be vacuumed until it settles into every nook and cranny. To prevent this, it is necessary to tighten all of the bolts at the beginning of, as well as intermittently during, each job.

It is, therefore, an object of this invention to provide a barrier filter cartridge which is specially adapted for pulse-back vacuum applications. Another object of this invention is to provide a barrier filter cartridge which operates efficiently in construction-type vacuum applications. A further object of this invention is to provide a barrier filter cartridge which is efficient in collecting particulate resulting from sanding, grinding and cutting wood, plaster, concrete and the like. Yet another object of this invention is to provide a barrier filter cartridge which is efficient in vacuuming a highly dust contaminated atmosphere. It is also an object of this invention to provide a barrier filter cartridge which does not have a circular cylindrical filter media. Still another object of this invention is to provide a barrier filter cartridge which does not have a filter media which widens from top to bottom. An additional object of this invention is to provide a barrier filter cartridge which does not require an outer casing. Another object of this invention is to provide a barrier filter cartridge which does not require disengagement of removable parts to clean or replace the filter. A further object of this invention is to provide a barrier filter cartridge which facilitates cleaning and replacement of the filter. Yet another object of this invention is to provide a barrier filter cartridge which does not require nuts, bolts or gaskets in its assembly. It is also an object of this invention to provide a barrier filter cartridge which does not have components which loosen in response to operating vibration or the jostling experienced during loading, transport and unloading. Still another object of this invention is to provide a barrier filter cartridge which reduces the likelihood of occurrence of gaps via which collected particulate may be re-circulated through the machine clean air passage. And it is an object of this invention to provide a barrier filter cartridge which relieves the necessity for tightening connections of the cartridge before and during each job.

SUMMARY OF THE INVENTION

In accordance with the invention, a spin-on barrier filter cartridge is provided in which an inverted frustum-shaped filter media defines a clean air chamber. A bottom cap blocks air flow through a bottom of the chamber and a top cap restricts air flow through a top of the chamber into a passage concentric with the chamber. The filter media has a pleated cross-section in planes parallel to its frustum plane. The bottom and top caps each have concentric flanges sandwiching the bottom and top portions of the media. The flanges may be tapered to contour to the apices of the accordion-like filter media. An inverted frustum-shaped screen-like core abuts the inner apices of the pleated media. The outer face of the core and the bottom and top caps are fixed to the bottom and top edges of the media so as to hold the cartridge together and also to seal the junctions against air flow. An externally threaded nipple extends upwardly from the top cap and defines the concentric passage. An internally threaded nipple cooperably engagable on the externally threaded nipple is adapted at its upper end to be fixed to a support structure. An O-ring sized to be seated around the externally threaded nipple is compressed between the bottom edge of the internally threaded nipple and the top cap when the nipples are fully threadedly engaged. The nipples are threaded so as to cause their engagement to tighten in response to vortical air flow in the chamber.

In one satisfactory embodiment, the core is formed from a galvanized, expanded metal screen with an approximately 73% open diamond pattern welded to itself along an overlapping seam. The media frustum is formed from a solvent based phenolic resin-impregnated cellulose sheet with radial grooves in face-to-face surfaces of its accordion-like body and glued to itself along an overlapping seam. The accordion-like body has approximately 10 convolutions per inch of media and a slope of approximately 1½ degrees. The body has an approximately 5½" top outer diameter, an approximately 5³⁄₃₂" bottom outer diameter, approximately ¾" deep corrugations and an approximately 9⅛" height.

BRIEF DESCRIPTION OF THE DRAWINGS

Other objects and advantages of the invention will become apparent upon reading the following detailed description and upon reference to the drawings in which.

While the invention will be described in connection with a preferred embodiment thereof, it will be understood that it is not intended to limit the invention to that embodiment or to the details of the construction or arrangement of parts illustrated in the accompanying drawings.

DETAILED DESCRIPTION

Figure 2:
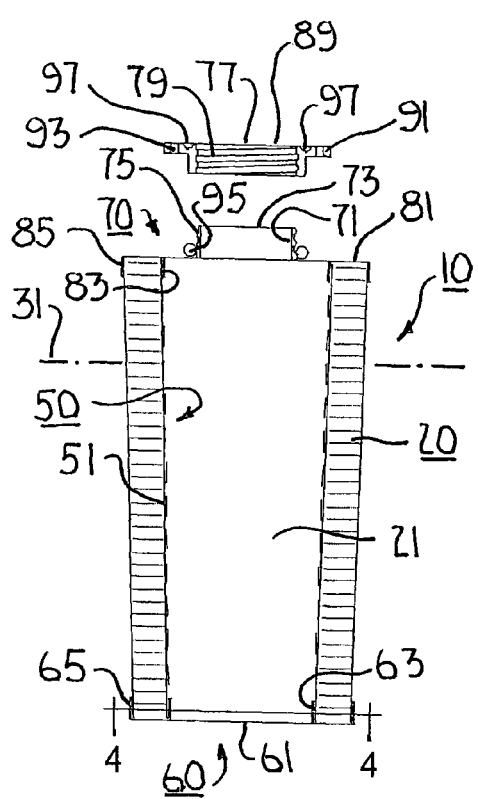
FIG. 2 is a diametric cross-sectional view of the cartridge of FIG. 1 in its assembled condition.
Figure 1:
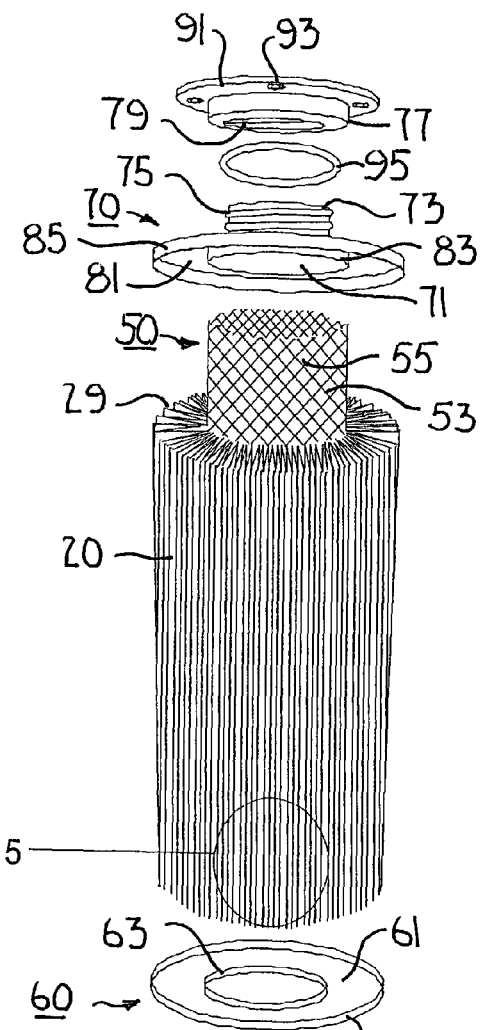
FIG. 1 is a perspective assembly view of a preferred embodiment of the spin-on barrier filter cartridge.
Figure 3:
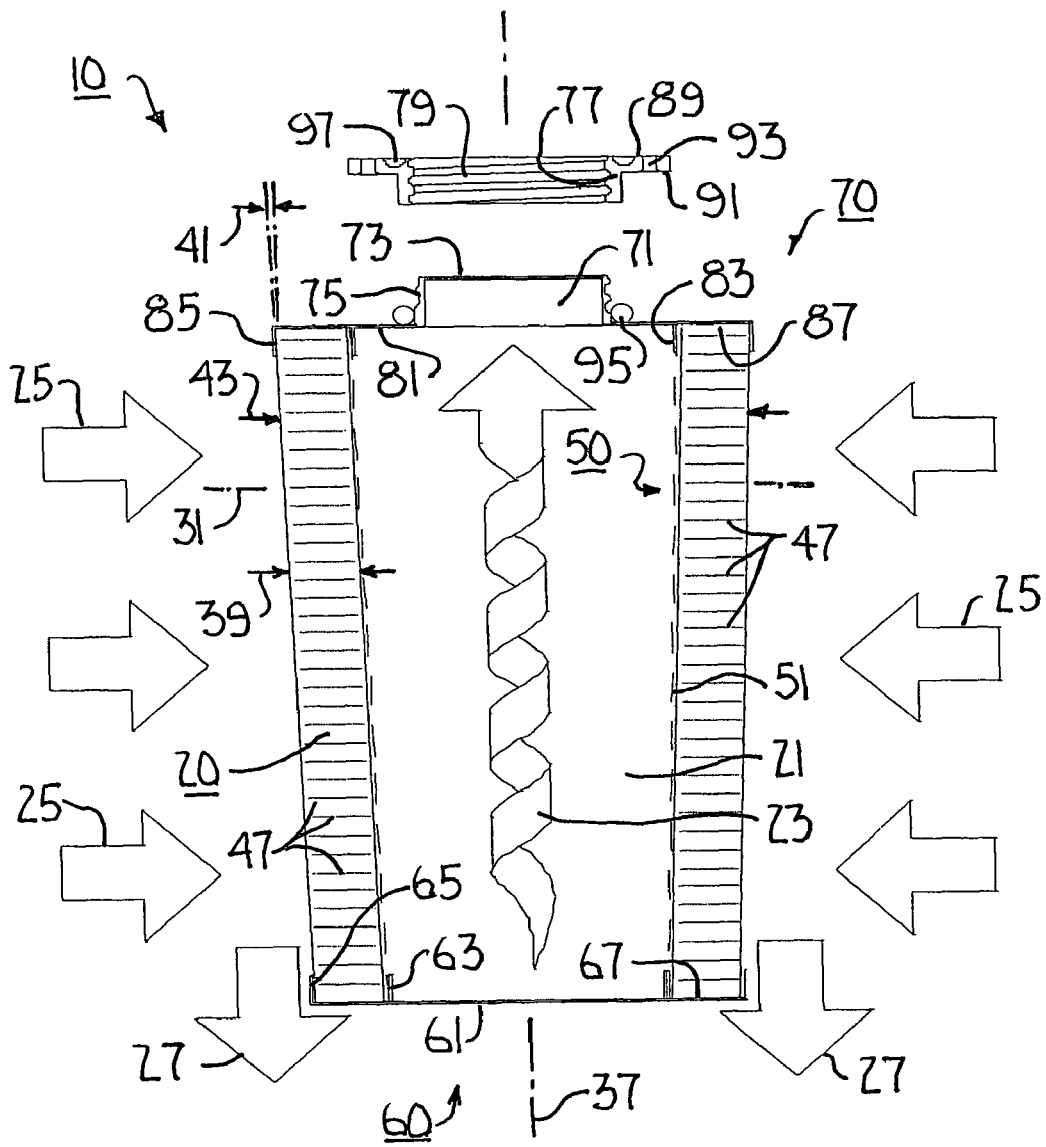
FIG. 3 is a diametric cross-sectional view illustrating some of the air flow and dust patterns of the cartridge of FIG. 1.
Figure 4:
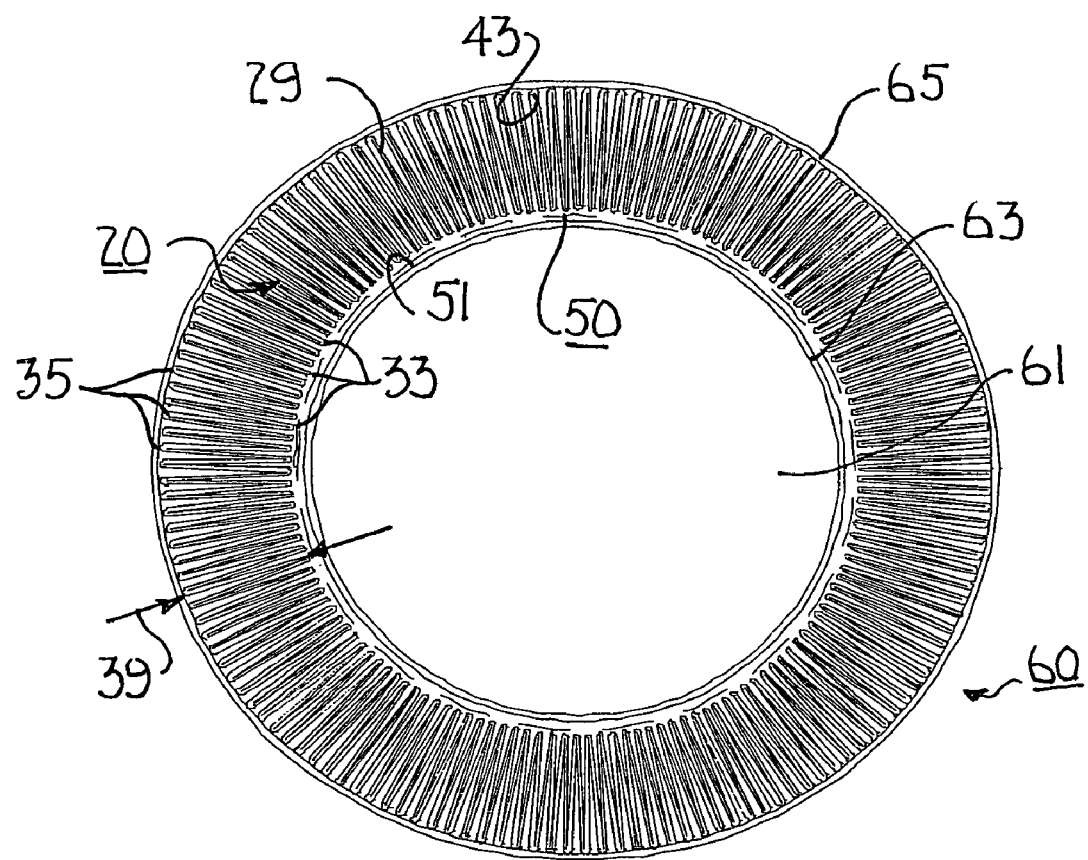
FIG. 4 is a cross-sectional view taken along the line 4-4 of FIG. 2.

Turning first to FIGS. 1-4, the spin on barrier filter cartridge 10 has a filter media 20, a core 50, a lower end cap 60 and an upper end cap 70. The filter media 20 defines a clean air chamber 21. The core 50 strengthens the filter media 20. The lower end cap 60 blocks the flow of air through the bottom of the chamber 21. The upper end cap 70 restricts the flow of air through the top of the chamber 21 to a passage 71 through the upper end cap 70. The end caps 60 and 70 also hold the cartridge 10 together. The upper end cap passage 71 is defined by a nipple 73 which has external threads 75 so that the cartridge 10 can be mounted and removed by simply screwing the nipple 73 into a cooperable nipple 77 mounted on the vacuum (not shown). The filter media 20 is configured in the shape of an inverted frustum. Consequently, as best seen in FIG. 3, the upwardly expanding chamber 21 causes an air flow vortex 23. The threads 75 are oriented so that the vortex 23 tends to screw the cartridge 10 into the receiving vacuum nipple 77 and maintain the secure mounting of the cartridge 10 in the vacuum (not shown). Also, since the air intake side 25 of the inverted frustum filter media 20 tapers inwardly toward the bottom of the cartridge 10, the filter media 20 does not interfere with the downward path 27 of settling dust.

Figure 5:
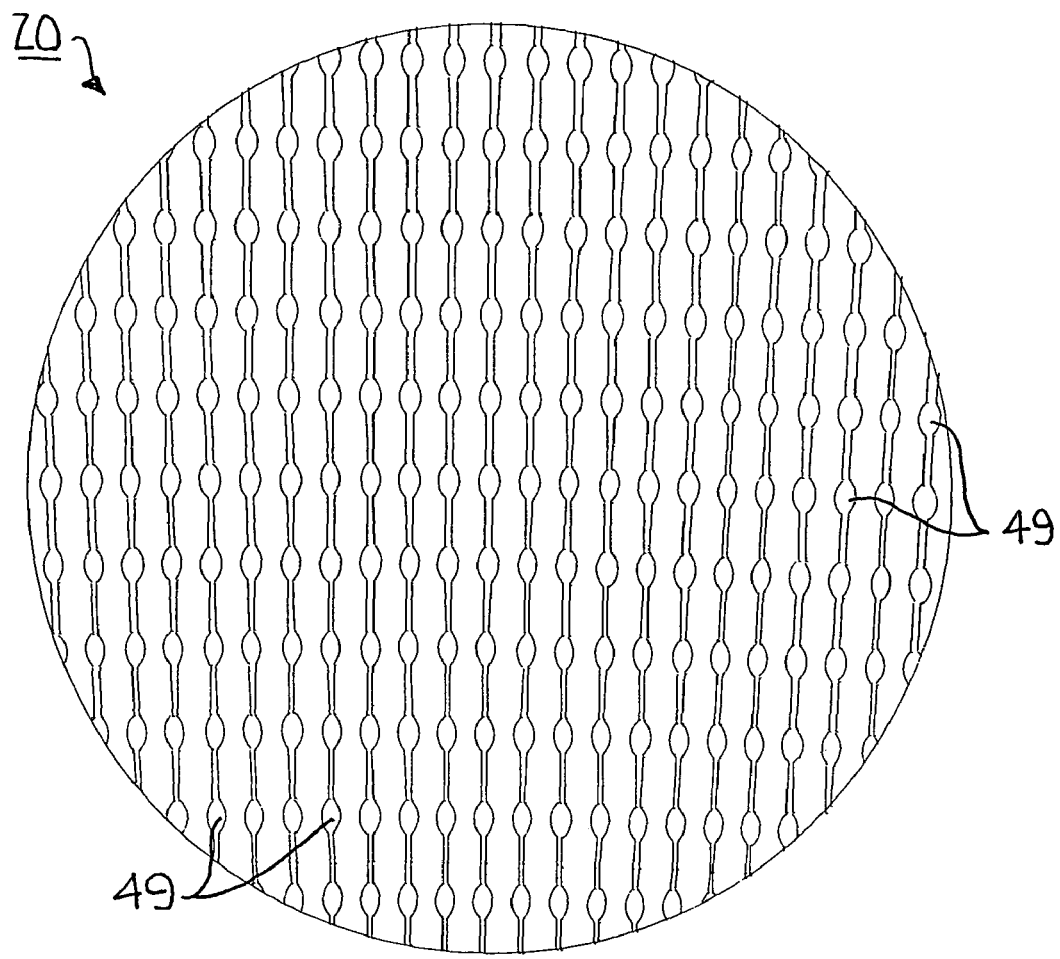
FIG. 5 is an exploded view of the area 6 of FIG. 1.

The filter media 20 preferably has a pleated cross-section 29 in planes parallel to its frustum plane 31. The inner 33 and outer 35 apices of the accordion-like media 20 define concentric inner and outer conical walls about the cartridge center axis 37. In the prototype, the media 20 has an approximately 5½" top diameter across its outer apices 35, an approximately 5³⁄₃₂" bottom diameter across its inner apices 33, a height of approximately 9⅛" and a constant depth of corrugations 39 of approximately ¾". This results in a slope 41 of approximately 1½ degrees in relation to the center axis 37. Approximately 150 convolutions of media 20 in a cartridge 10 as described provides suitable air flow characteristics. These dimensions may vary considerably in different size cartridges, but a ratio of approximately 10 convolutions of media 20 per inch of bottom outer circumference 43 of media 20 generally affords the desired flow characteristics. Preferably, the heighthwise ends of the media 20 are overlapped and held together by glue 45 along their seam. A media 20 formed from a pleated sheet of solvent based phenolic resin-impregnated cellulose is preferred. This material provides more consistent results, especially for particulate resulting from sanding or cutting wood, in a wide range of climatic conditions. It is also preferred, as is best seen in FIG. 5, that the media 20 has opposed radial grooves 47 which form air flow ducts 49 between face-to-face surfaces of the accordion-like pleats. The ducts 49 are specially significant in facilitating the flow of air at the bottom of the media 20 where the frustum compresses the pleats into a smaller diameter.

The core 50 is also frustum-shaped and inverted so that its outer surface 51 abuts the inner apices 33 of the filter media 20. It provides strengthening support against the force of air intake 25 through the media 20. In some applications, depending on the media 20 used and the flow characteristics, the core 50 may not be necessary. In the prototype, the core 50 was formed from galvanized, expanded metal screen 53 having 73% open diamond pattern 55. Preferably, the heighthwise ends of the screen 53 are overlapped and held together by welds 57 along their seam.

The lower end cap 60 has a solid base 61 with inner 63 and outer 65 concentric flanges. The flanges 63 and 65 are radially spaced from a center of the base 61 so that they sandwich the pleated cross-section 29 at the bottom of the media 20 and also, if one is used, the bottom of the core 50. The solid base 61 blocks the flow of air through the bottom of the air flow chamber 21. The flanges 63 and 65 hold the media 20 and the core 50 in abutment. Glue 67 on the upper face of the base 61 between the flanges 63 and 65 seals the junction of the media 20 and the cap 60 against air flow and fixes the cap 60 to the media 20. As shown, the flanges 63 and 65 may be tapered upwardly outwardly to conform to the media 20 and aid in securing the connection of the cap 60 and media 20.

The upper end cap 70 has its nipple 83 sized to an inner diameter so that the air flow passage 71 is not greater than the inner diameter of the upper end of the media 20. The cap 70 has a solid base 81 open only at the passage 71 inner 83 and outer 85 flanges concentric about the axis 37 of the cartridge 10 and the nipple 73. The flanges 83 and 85 are radially spaced from the center of the base 81 so that they sandwich the pleated cross-section 29 at the top of the media 20 and also, if one is used, the top of the core 50. The base 81 restricts the flow of air through the top of the air flow chamber 21 into the passage 71. The flanges 83 and 85 hold the media 20 and the core 50 in abutment. Glue 87 on the upper face of the base 81 between the flanges 83 and 85 seals the junction of the media 20 and the cap 80 against air flow and fixes the cap 80 to the media 20. As shown, the flanges 83 and 85 may be tapered downwardly inwardly to conform to the media 20 and aid in securing the connection of the cap 80 and media 20. The mounting nipple 77 with internal threads 79 for engaging the external threads 75 of the upper cap nipple 73 is adapted at its upper end 89 to be permanently mounted on the vacuum (not shown). In the prototype, an annular flange 91 has apertures 93 for screws or bolts (not shown) for attachment to the vacuum (not shown). Welding or other means of mounting could also be used. An O-ring 95 sized to be seated around the externally threaded nipple 75 is compressed between the bottom edge of the supporting nipple 77 and the top face of the upper cap 70 to assure a complete seal of the air flow passage 71. As shown, the support nipple 77 also has a seat 97 in its flange 91 to receive an O-ring (not shown) to seal against the mating air duct of the vacuum (not shown).

Thus, it is apparent that there has been provided, in accordance with the invention, a barrier filter cartridge that fully satisfies the objects, aims and advantages set forth above. While the invention has been described in conjunction with specific embodiments thereof, it is evident that many alternatives, modifications and variations will be apparent to those skilled in the art and in light of the foregoing description.

Accordingly, it is intended to embrace all such alternatives, modifications and variations as fall within the spirit of the appended claims.

What is claimed is:

1. A spin-on barrier filter cartridge comprising:
an inverted frustum-shaped filter media defining a clean air chamber;
means fixed to said media for blocking air flow through a bottom of said chamber;
means fixed to said media for restricting air flow through a top of said chamber to a passage concentric therewith, said means having a threaded surface extending axially upwardly above said top of said chamber.

2. A cartridge according to claim 1, said media having a pleated cross-section in a frustum plane.

3. A cartridge according to claim 2 having an inverted frustum-shaped screen-like core abutting inner apices of said pleated media.

4. A cartridge according to claim 1, said surface being externally threaded.

5. A cartridge according to claim 4 further comprising an O-ring sized to be seated around said externally threaded surface.

6. A spin-on barrier filter cartridge comprising:
an inverted frustum-shaped filter media defining a clean air chamber;
means for blocking air flow through a bottom of said chamber;
means for restricting air flow through a top of said chamber to a passage concentric therewith; and
an externally threaded nipple extending upwardly from said restricting means and defining said passage, said nipples having threads rotationally directed to cause their engagement in a threaded receptacle to tighten in response to vortical air flow in said chamber.

7. A spin-on barrier filter cartridge comprising:
an inverted frustum-shaped screen-like core defining a clean-air chamber;
an accordion-like filter media having inner apices concentrically abutting an outer face of said core;
means for holding a bottom of said core and said media in concentric abutment and for blocking air flow through a bottom of said chamber;
means for holding a top of said core and said media in concentric abutment and for restricting air flow through a top of said chamber to a passage concentric therewith;
means for fixing said bottom and said top of said media to said holding and blocking means and said holding and restricting means, respectively, and for sealing junctions thereof against air flow therethrough;
an externally threaded nipple extending upwardly from said restricting means and defining said passage; and
an internally threaded nipple cooperably engagable on said externally threaded nipple and adapted at an upper end thereof to be fixed to a support structure, said nipples having threads rotationally directed to cause their engagement to tighten in response to vertical air flow in said chamber.

8. A cartridge according to claim 7 further comprising an O-ring sized to be seated around said externally threaded nipple and compressed between a bottom edge of said internally threaded nipple and said restricting means when said nipples are fully threadedly engaged.

9. A cartridge according to claim 7, said core having an approximately 73% open diamond pattern.

10. A cartridge according to claim 7, said core being formed from a galvanized, expanded metal screen.

11. A cartridge according to claim 10, said core being welded along a seam thereof.

12. A cartridge according to claim 7 further comprising opposed radial grooves in face-to-face surfaces of said accordion-like filter media.

13. A cartridge according to claim 7, said media being formed from solvent based phenolic resin-impregnated cellulose sheet.

14. A cartridge according to claim 13, said media being glued along a seam thereof.

15. A cartridge according to claim 7, said accordion-like filter media having approximately 10 convolutions per inch of media.

16. A cartridge according to claim 15, said accordion-like filter media having a slope of approximately 1½ degrees.

17. A cartridge according to claim 15, said accordion-like filter media having an approximately 5½" top outer diameter, an approximately 5 3/32" bottom outer diameter, approximately ¾" deep corrugations and an approximately 9⅛" height.

18. A cartridge according to claim 7, said bottom and top holding means each having concentric flanges sandwiching bottom and top portions, respectively, of said media therebetween.

19. A cartridge according to claim 18, said flanges being tapered to contour to the apices of said accordion-like filter media.

* * * * *